2 Sheets—Sheet 1.

W. LOWE.
Self-Adjusting Cut-Off for Engines.

No. 201,353. Patented March 19, 1878.

Witnesses:
P. C. Dieterich
Frank H. Duffy

Inventor:
William Lowe
Per C. H. Watson & Co. Attorneys.

N. PETERS, PHOTO-LITHOGRAPHER, WASHINGTON, D. C.

W. LOWE.
Self-Adjusting Cut-Off for Engines.
No. 201,353. Patented March 19, 1878.
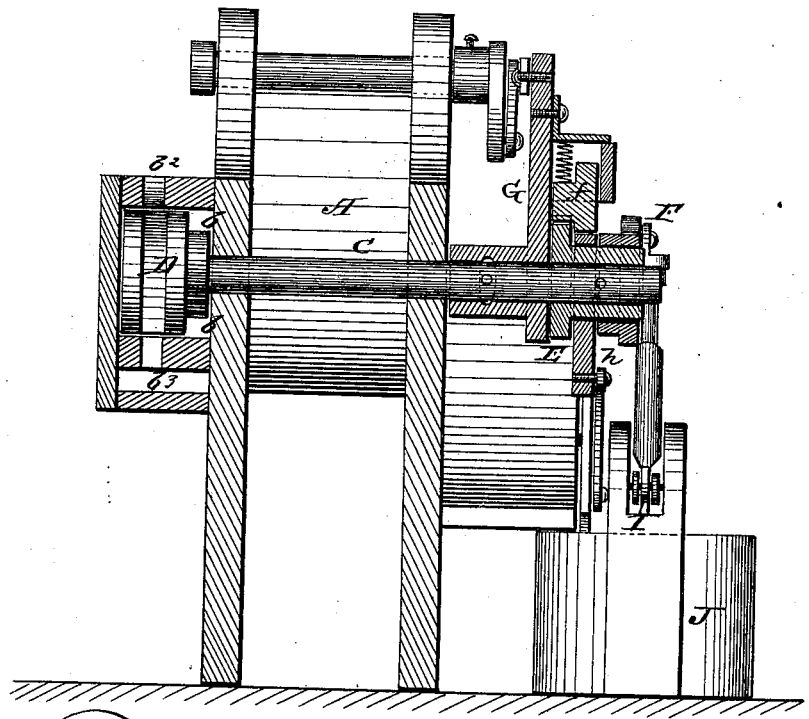
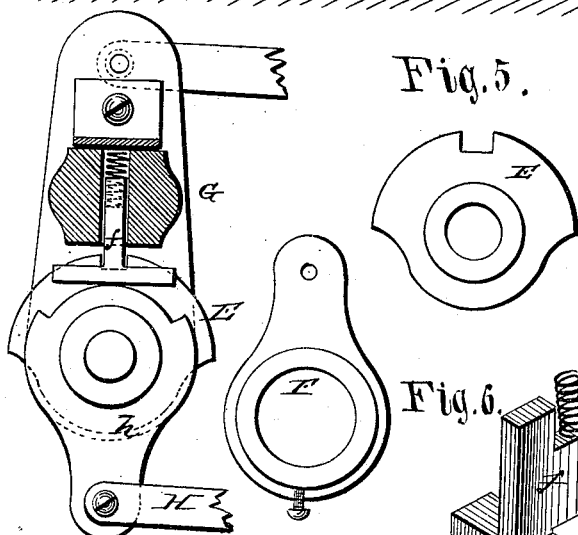
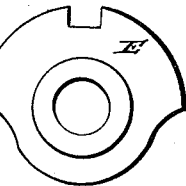
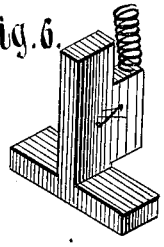

UNITED STATES PATENT OFFICE.

WILLIAM LOWE, OF BRIDGEPORT, CONNECTICUT.

IMPROVEMENT IN SELF-ADJUSTING CUT-OFFS FOR ENGINES.

Specification forming part of Letters Patent No. 201,353, dated March 19, 1878; application filed February 18, 1878.

*To all whom it may concern:*

Be it known that I, WILLIAM LOWE, of Bridgeport, in the county of Fairfield and State of Connecticut, have invented certain new and useful Improvements in Self-Adjusting Cut-Off Engines; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The object of this invention is to simplify and improve the class of engines known as "self-adjusting cut-off engines," which have liberating valve-gear. This is accomplished by the use of one valve for each end of the cylinder, instead of two, which are now used in all the above-named engines, said valve being operated for admitting steam to the cylinder by a liberating self-adjusting valve-gear, and used to exhaust the steam by a fixed positive motion taken from said liberating valve-gear.

This invention consists of the steam-chest, valve-seats, and valves, liberating valve-gear, and its application to the valves; also, the operating of both valves for cutting off the steam by one dash-pot and weight.

Figure 1:
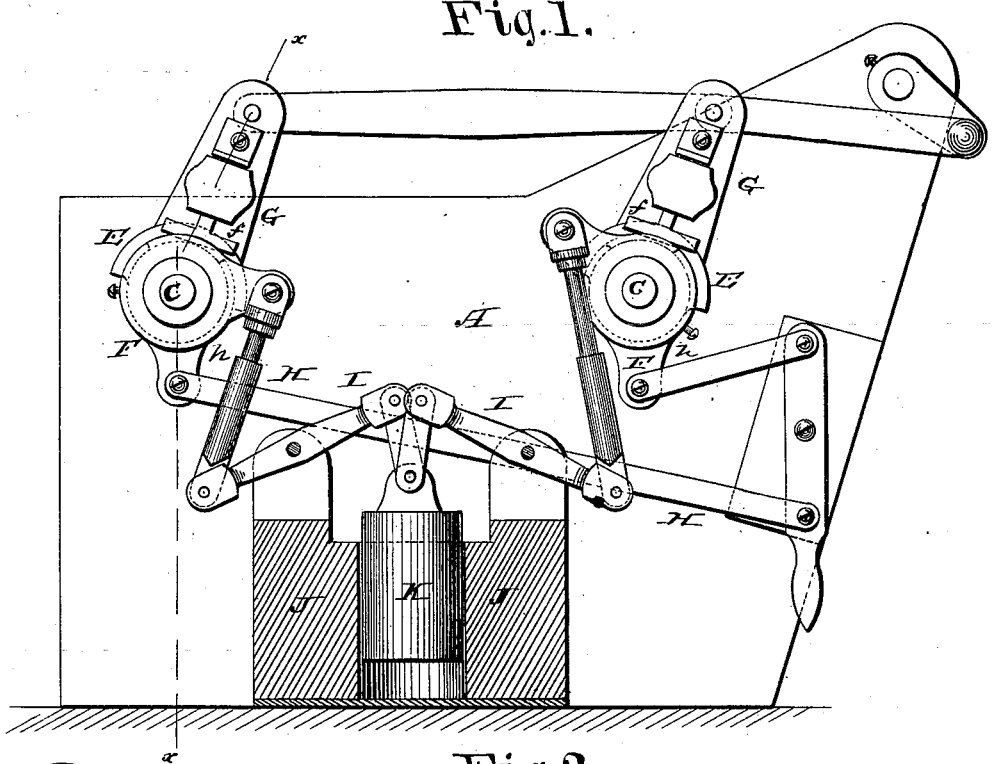
Figure 2:
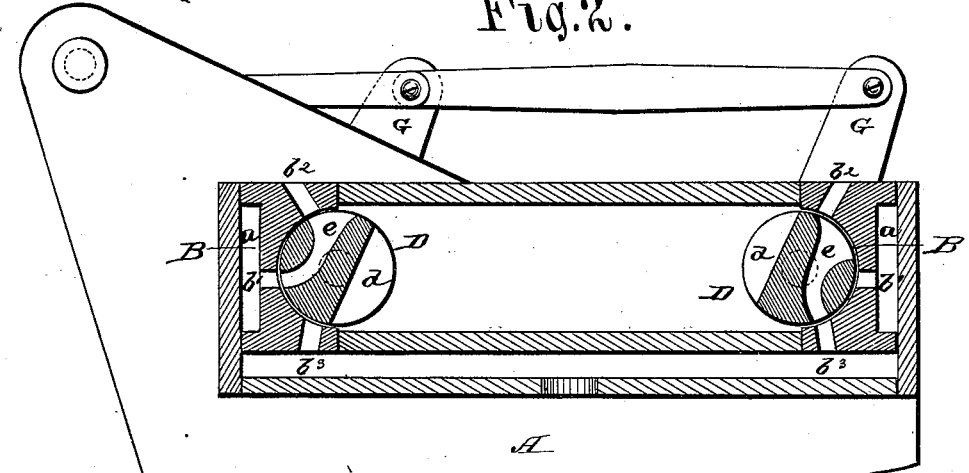

In the annexed drawings, to which reference is made, and which fully illustrate this invention, Figure 1 is a front elevation, partly in section. Fig. 2 is a rear view, partly in section. Fig. 3 is a transverse section on line $x$ $x$, Fig. 1; and Figs. 4, 5, and 6 are detail views of my invention.

A represents the steam-chest, which is cast with a valve-seat, B, in each end, with a steam-passage, $a$, around the ends of the valve-seats to a steam-space, $b$, behind the valve-seat. The seat has three ports, $b^1$ $b^2$ $b^3$—one, $b^1$, through it, one $b^2$, to the cylinder, and one, $b^3$, to the exhaust-chest.

The valve D is cast with an internal passage, $d$, through it, through which the steam is admitted to and exhausted from the cylinder. Steam is also admitted from the steam-chest side of the valve over its top at $e$ into the passage through the valve and into the cylinder.

Each valve D is secured on an arbor, C, to which the valve-gear is connected.

The valve-gear consists of the vibrating levers E and latches F upon them; also, valve-levers G, latch-liberating levers H, weight-levers I, dash-pot J, and weight K, and their levers and connections.

The arrangement and operation are as follows: The lower mouths of the passages $d$ through the valves D are closed upon that part of the valve-seats between the port through the valve-seat and the exhaust-port, giving the necessary lap upon each side. The vibrating and valve levers are placed in a vertical position, with the latches F engaging the valve-levers G, and the keys $f$ in the valve-shafts C engaging the vibrating levers E. The weight-levers I are in contact with the weight K, and the eccentric placed in the center of its throw. Move the eccentric $h$ around the shaft until the valve will be ready to give steam to the cylinder. Place the crank upon the center, with the piston at the end of the cylinder. Set the engine in motion, and the valves will have a fixed positive motion for admitting and exhausting the steam to and from the cylinder until the speed runs up and the governor brings the latch-liberating levers into contact with the latches, when liberation and cut-off take place, and the vibrating levers continue their movement, and, returning, engage the keys $f$ in the valve-shaft, which opens the valve to exhaust the steam, while at about the same time the latch engages the valve-lever and returns the valve to give steam, and cuts it off, as before.

The reverse movement of the latch-liberating levers prevents the latches engaging the valve-levers, and stops the engine when the governor-belt breaks or runs off the pulley. This reverse movement is taken from a portion of the movement of the governor-sleeve.

The valves and their respective shafts or arbors are cast in one piece of steel, the valves and valve-seats are tapered, and the shafts are hung in hardened-steel bearings, upon which the valves are brought up to their seats, so as to be steam-tight.

The valves are practically balanced when open and giving steam to the cylinder, on account of the internal pressure, and also balanced when closed, after cutting off the steam, so that the friction upon the bearings and seats is reduced to such an extent that the valves can be operated by the valve-motion without shock or damage to the parts.

I do not confine myself to this form of steam-chest, valves, and valve-gear, because several other forms and combinations may be used with good effect with my plan of operating the valves. The common D-valve, either in flat or circular seats, may be used; also, a balanced piston-valve, and other forms. Other liberating valve-gear may be used in connection with these valves, or with this arrangement of valves.

Having thus fully described my invention, what I claim as new, and desire to secure by Letters Patent, is—

1. The single valve applied to each end of the cylinder of a steam or gas engine, and said valves operated as differential self-adjusting cut-off valves, while admitting steam or gas to the cylinder, and operating the same valves to exhaust the steam or gas with a fixed positive motion, constructed and arranged as shown and described.

2. The liberating valve-gear herein described, applied to two valves of a steam or gas engine, which shall operate them as self-adjusting cut-off valves and positive exhausting-valves, constructed substantially as herein set forth.

3. The liberating valve-gear, constructed as described, and operating both cut-off valves with one dash-pot and weight, substantially as herein set forth.

In testimony that I claim the foregoing as my own I have hereto affixed my signature in presence of two witnesses.

WILLIAM LOWE.

Witnesses:
R. TOMLINSON,
M. B. BEARDSLEY.